United States Patent
Hsu (10) Patent No.: US 10,421,194 B2
(45) Date of Patent: Sep. 24, 2019

(54) TOOL DRIVING MODULE AND ROBOT MANIPULATOR EMPLOYING SAME

(71) Applicant: Delta Electronics, Inc., Taoyuan (TW)

(72) Inventor: Chih-Ming Hsu, Taoyuan (TW)

(73) Assignee: DELTA ELECTRONICS, INC., Taoyuan (TW)

(*) Notice: Subject to any disclaimer, the term of this patent is extended or adjusted under 35 U.S.C. 154(b) by 341 days.

(21) Appl. No.: 15/583,508

(22) Filed: May 1, 2017

(65) Prior Publication Data
US 2018/0178394 A1 Jun. 28, 2018

(30) Foreign Application Priority Data
Dec. 27, 2016 (TW) .............................. 105143322 A (51) Int. Cl.
*B25J 15/00* (2006.01)
*B25J 9/04* (2006.01)

(52) U.S. Cl.
CPC ........... *B25J 15/0019* (2013.01); *B25J 9/044* (2013.01); *Y10S 901/30* (2013.01)

(58) Field of Classification Search
CPC .... B25J 15/0019; B25J 9/044; B25J 17/0241; B25J 17/0258; B25J 17/02; Y10S 901/30
USPC ........ 74/490.01, 490.05, 490.06; 901/27, 28, 901/29, 41
See application file for complete search history.

(56) References Cited

U.S. PATENT DOCUMENTS

| | | | | |
|---|---|---|---|---|
| 2013/0118286 A1* | 5/2013 | Long | ................. | B25J 17/0283 74/490.01 |
| 2014/0166023 A1* | 6/2014 | Kishi | ................. | A61B 17/29 128/849 |
| 2015/0230870 A1* | 8/2015 | Jiang | ................. | B25J 18/025 74/490.05 |
| 2015/0251322 A1* | 9/2015 | Goodwin | ............. | B25J 11/008 74/490.03 |
| 2016/0129595 A1* | 5/2016 | Gerio | ................. | B25J 9/1676 700/255 |
| 2018/0021900 A1* | 1/2018 | Huang | ................ | B23P 19/066 700/114 |

\* cited by examiner

*Primary Examiner* — David H Bollinger
(74) *Attorney, Agent, or Firm* — Kirton McConkie; Evan R. Witt (57) ABSTRACT

A tool driving module for a robot manipulator comprising an end-shaft is disclosed. The tool driving module comprises a connection part, a motor driving module, a driving arm and a tool fixing bracket. The connection part comprising a combination bracket is coupled with the end-shaft. The motor driving module is coupled with the combination bracket. The driving arm is connected with the motor driving module, and driven by the motor driving module to rotate. The tool fixing bracket is connected with the driving arm for mounting a tool thereon. The tool fixing bracket and the tool are driven by the driving arm to rotate synchronously, and a tool center point of the tool and an extending line of an axis of the end-shaft are at a common point via the rotation of the tool.

18 Claims, 9 Drawing Sheets

TOOL DRIVING MODULE AND ROBOT MANIPULATOR EMPLOYING SAME

CROSS-REFERENCE TO RELATED APPLICATION

This application claims priority to Taiwan Patent Application No. 105143322, filed on Dec. 27, 2016, the entire contents of which are incorporated herein by reference for all purposes.

FIELD OF THE DISCLOSURE

The present disclosure relates to a tool driving module, and more particularly to a tool driving module capable of changing the work position of the tool by driving the tool to rotate and allowing a tool center point of the tool and an extending line from an axis of an end-shaft of an articulated arm of the robot manipulator to be at a common point via the rotation of the tool. The present disclosure also relates to a robot manipulator employing the tool driving module.

BACKGROUND OF THE DISCLOSURE

With increasing development of industries, robot manipulators having articulated arm have been applied to replace manpower for improving production efficiency and reducing cost. The tool or a tool module capable of carrying the tool thereon is connected with the end-shaft of the articulated arm to achieve various applications, for example tightening screw.

At present, the robot manipulator can be roughly divided into three types. In the first-type robot manipulator, the tool is directly connected with the end-shaft of the articulated arm of the robot manipulator. In the second-type robot manipulator, the tool module is connected with the end-shaft of the articulated arm, the work position of the tool carried by the tool module is fixed, and a center line of the tool and the axis of the end-shaft are parallel and apart from each other with a distance. In the third-type robot manipulator, the tool module is connected with the end-shaft of the articulated arm of the robot manipulator, and an inclination angle of the tool carried by the tool module can be adjusted so as to change the work position of the tool according to the practical requirements by hand.

However, the three types of robot manipulators have respective drawbacks. For the first-type robot manipulator, the tool is directly connected with the end-shaft of the articulated arm, and the work position of the tool cannot be changed. Under this circumstance, the form and the length of the tool are limited by the accommodation space below the end-shaft of the articulated arm. Consequently, the applicability and the working range of the tool are limited. For the second-type robot manipulator, the work position of the tool cannot be changed similarly so that the working range of the tool is limited. For the third-type robot manipulator, the drawbacks of the above-mentioned first-type robot manipulator and second-type robot manipulator are overcome. Nevertheless, the inclination angle of the tool carried by the tool module should be adjusted by hand, which causes the complexity of use and reduces the production efficiency.

Various robot manipulators are developed for solving the problems of the above-mentioned three types of robot manipulators, but the robot manipulators have the drawbacks of limiting and reducing the working range, for example the working range of the tool is smaller than the working range of the end-shaft of the articulated arm of the robot manipulator.

Therefore, there is a need of providing a tool driving module and a robot manipulator employing the same to obviate the drawbacks encountered from the prior arts.

SUMMARY OF THE DISCLOSURE

It is an object of the present disclosure to provide a tool driving module and a robot manipulator employing the same. By using the inventive tool driving module, the tool disposed on the tool driving module is driven by the tool driving module to rotate for changing the work position of the tool automatically. The tool center point of the tool and the extending line from the axis of the end-shaft of an articulated arm are at a common point via the rotation of the tool. Under this circumstance, the working range of the tool remains the same with the working range of the end-shaft of the articulated arm. Consequently, the working range of the tool is extended. In addition, the tool driving module can be detachably connected with the end-shaft of the articulated arm of the robot manipulator without changing the original structure and circuit of the robot manipulator. Moreover, the tool of the tool driving module can be replaced for performing required tasks. Consequently, the cost is reduced.

In accordance with one aspect of the present disclosure, a tool driving module is provided. The tool driving module is applicable to a robot manipulator comprising an end-shaft. The tool driving module comprises a connection part, a motor driving module, a driving arm and a tool fixing bracket. The connection part comprising a combination bracket is coupled with the end-shaft. The motor driving module is coupled with the combination bracket. The driving arm is connected with the motor driving module, and driven by the motor driving module to rotate. The tool fixing bracket is connected with the driving arm for mounting a tool thereon. The tool fixing bracket and the tool are driven by the driving arm to rotate synchronously, and a tool center point of the tool and an extending line of an axis of the end-shaft are at a common point via the rotation of the tool.

In accordance with another aspect of the present disclosure, a robot manipulator is provided. The robot manipulator comprises an articulated arm and a tool driving module. The articulated arm comprises an end-shaft. The tool driving module can be detachably connected with the end-shaft of the articulated arm, and comprises a connection part, a motor driving module, a driving arm and a tool fixing bracket. The connection part comprising a combination bracket is coupled with the end-shaft. The motor driving module is coupled with the combination bracket. The driving arm is connected with the motor driving module, and driven by the motor driving module to rotate. The tool fixing bracket is connected with the driving arm for mounting a tool thereon. The tool fixing bracket and the tool are driven by the driving arm to rotate synchronously, and a tool center point of the tool and an extending line of an axis of the end-shaft are at a common point via the rotation of the tool.

DETAILED DESCRIPTION OF THE PREFERRED EMBODIMENT

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

Figure 1:
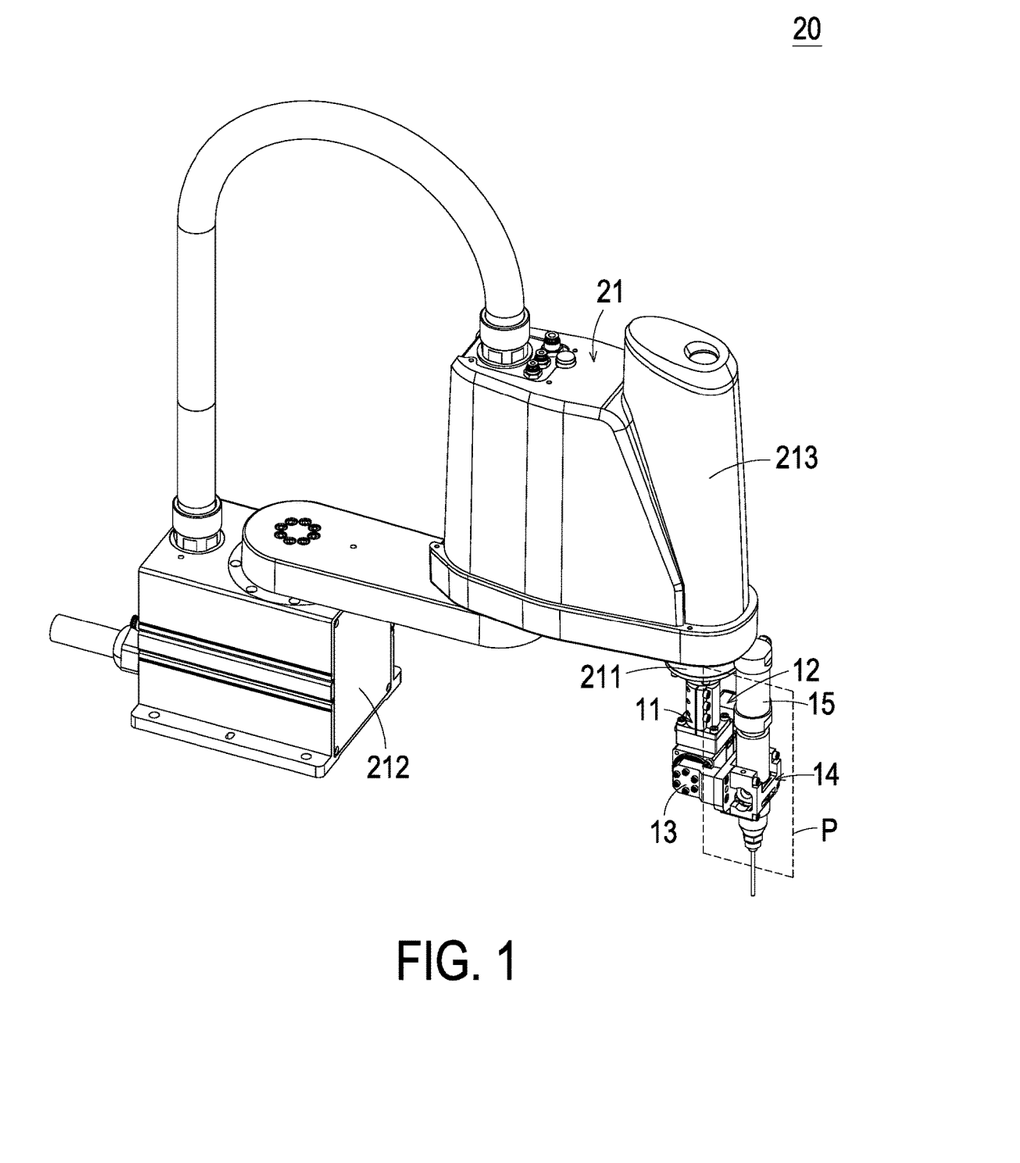
FIG. 1 is a schematic perspective view illustrating a robot manipulator according to an embodiment of the present disclosure.
Figure 2A:
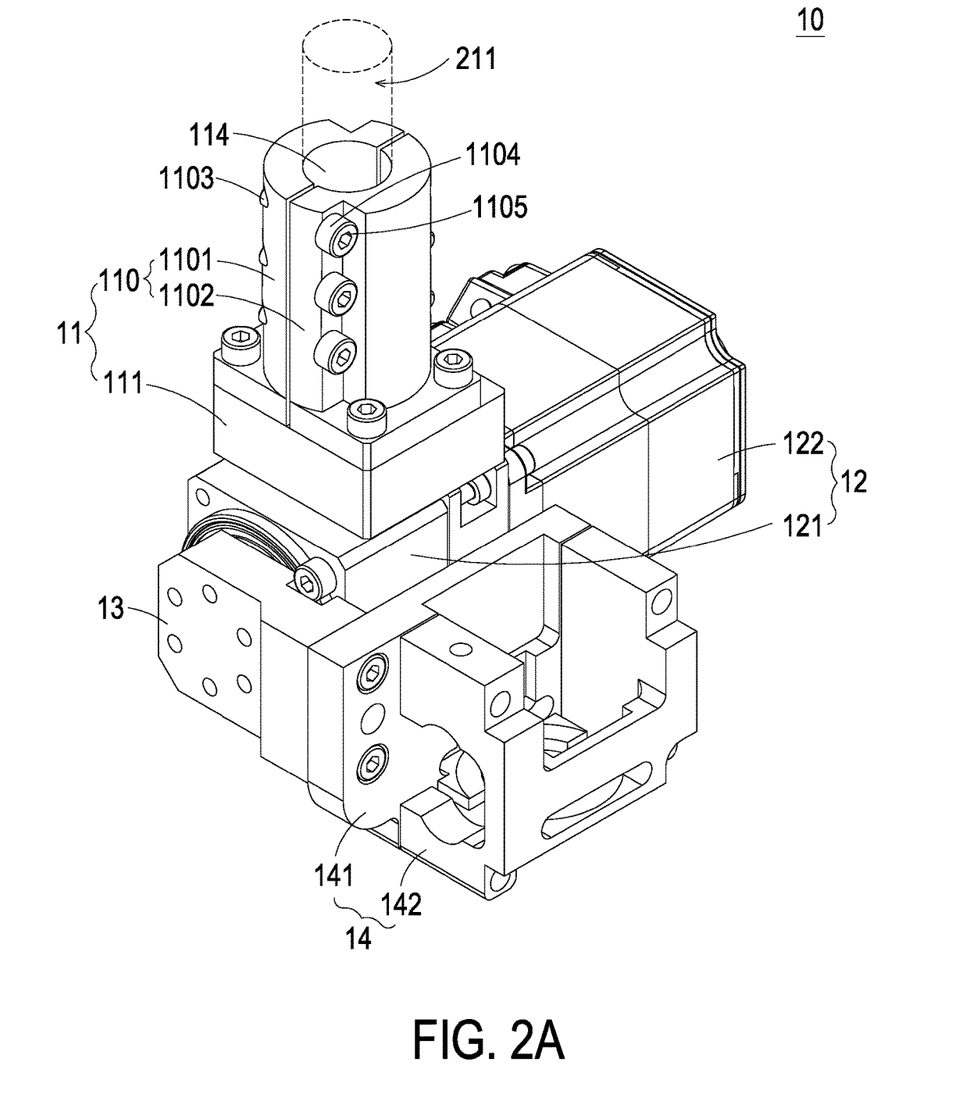
FIG. 2A is a schematic perspective view illustrating a tool driving module of FIG. 1.

FIG. 1 is a schematic perspective view illustrating a robot manipulator according to an embodiment of the present disclosure. FIG. 2A is a schematic perspective view illustrating a tool driving module of FIG. 1. As shown in FIGS. 1 and 2A, the robot manipulator 20 of the present disclosure is for example but not limited to a five axis robot manipulator. The robot manipulator 20 comprises an articulated arm 21 and a tool driving module 10. The articulated arm 21 comprises an end-shaft 211, a base 212 and a multi-axis mechanism 213. The multi-axis mechanism 213 having two-axis structure is connected with the base 212. The end-shaft 211 is rotatably coupled with the multi-axis mechanism 213 and able to be moved up and down along the perpendicular direction on the multi-axis mechanism 213. In some embodiments, the articulated arm 21 can be for example but not limited to a SCARA (Selective Compliance Assembly Robot Arm) or a Delta robot.

The tool driving module 10 is coupled with the end-shaft 211 and comprises a connection part 11, a motor driving module 12, a driving arm 13 and a tool fixing bracket 14. The connection part 11 is coupled with the end-shaft 211 of the articulated arm 21 and comprises a shaft connection sleeve 110 and combination bracket 111. The shaft connection sleeve 110 is securely coupled with the end-shaft 211 and comprises a first fixing part 1101 and a second fixing part 1102. The first fixing part 1101 comprises plural screw holes 1103. The second fixing part 1102 comprises plural screw holes 1104 corresponding to and aligned with the screw holes 1103 of the first fixing part 1101 respectively. In addition, a first hollow portion 114 is formed between the first fixing part 1101 and the second fixing part 1102 for accommodating at least portion of the end-shaft 211. Moreover, as the end-shaft 211 is disposed in the first hollow portion 114, plural screws 1105 are inserted into the respective screw holes 1103 of the first fixing part 1101 and the respective screw holes 1104 of the second fixing part 1102 and tightened. Under this circumstance, the accommodation space of the first hollow portion 114 becomes smaller and smaller, and matches with the outer periphery of the end-shaft 211. Consequently, the first fixing part 1101 and the second fixing part 1102 clamp the end-shaft 211 tightly, so that the tool driving module 10 is securely mounted on the end-shaft 211.

One side of the combination bracket 111 is coupled with the shaft connection sleeve 110 by engaging or screw tightening. The motor driving module 12 is coupled with the other side of the combination bracket 111 by engaging or screw tightening and comprises a speed reducer 121 and a motor 122. The speed reducer 121 is coupled with the combination bracket 111 and comprises a power output end. The motor 122 is coupled with the speed reducer 121 for driving the speed reducer 121, and can be controlled by an independent controller (not shown). The motor 122 and the speed reducer 121 are respectively perpendicular to the extending line from the axis of the end-shaft 211. The driving arm 13, for example the single driving arm 13 shown in FIG. 2A, is connected with the power output end of the speed reducer 121. As the motor 122 drives the speed reducer 121 to operate, the driving arm 13 is driven by the power output end of the speed reducer 121 to rotate. The driving arm 13 is rotated around a rotation axis 131, and the extending line of the rotation axis 131 is perpendicular to the extending line of the axis of the end-shaft 211. The tool fixing bracket 14 is connected with the driving arm 13 for carrying and mounting a tool 15. When the driving arm 13 rotates, the tool fixing bracket 14 and the tool 15 are driven by the driving arm 13 to rotate synchronously so that the angle of the tool 15 can be changed. For example, the tool 15 can be rotated from the position parallel to the axis of the end-shaft 211 to the position not parallel to the axis of the end-shaft 211, so that the work position of the tool 15 is changed. The tool fixing bracket 14 further comprises a connection part 141 and a clamping part 142. The connection part 141 is coupled with the driving arm 13. The clamping part 142 is detachably connected with the connection part 141. A clamping space is formed between the connection part 141 and the clamping part 142 for carrying and mounting the tool. The tool 15 is firmly fixed on the tool fixing bracket 14 via the clamping of the clamping part 142. In addition, as shown in FIG. 1, the tool 15 is for example but not limited to a gluing tool. Alternatively, the tool 15 can be other tool such as welding torch, clamping jaw, suction pad or electric tightener.

Figure 2B:
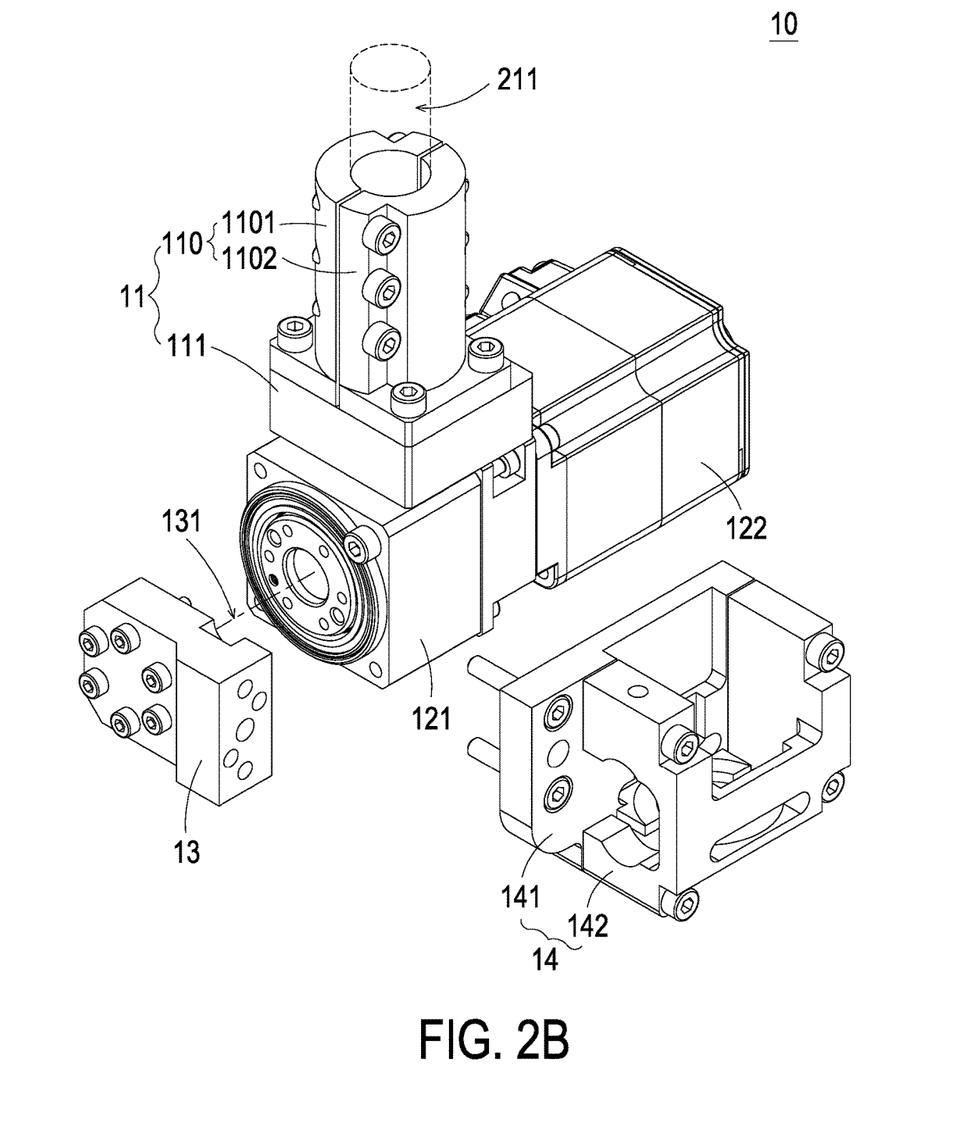
FIG. 2B is an exploded view illustrating the tool driving module of FIG. 1.

FIG. 2B is an exploded view illustrating the tool driving module of FIG. 1. As shown in FIGS. 1 and 2B, the axis of the end-shaft 211 and the center line of the tool 15 are located at the same plane P. The driving arm 13 is rotated around the rotation axis 131, and the rotation axis 131 is perpendicular to the plane P, where the axis of the end-shaft 211 and the center line of the tool 15 are located at.

Figure 3:
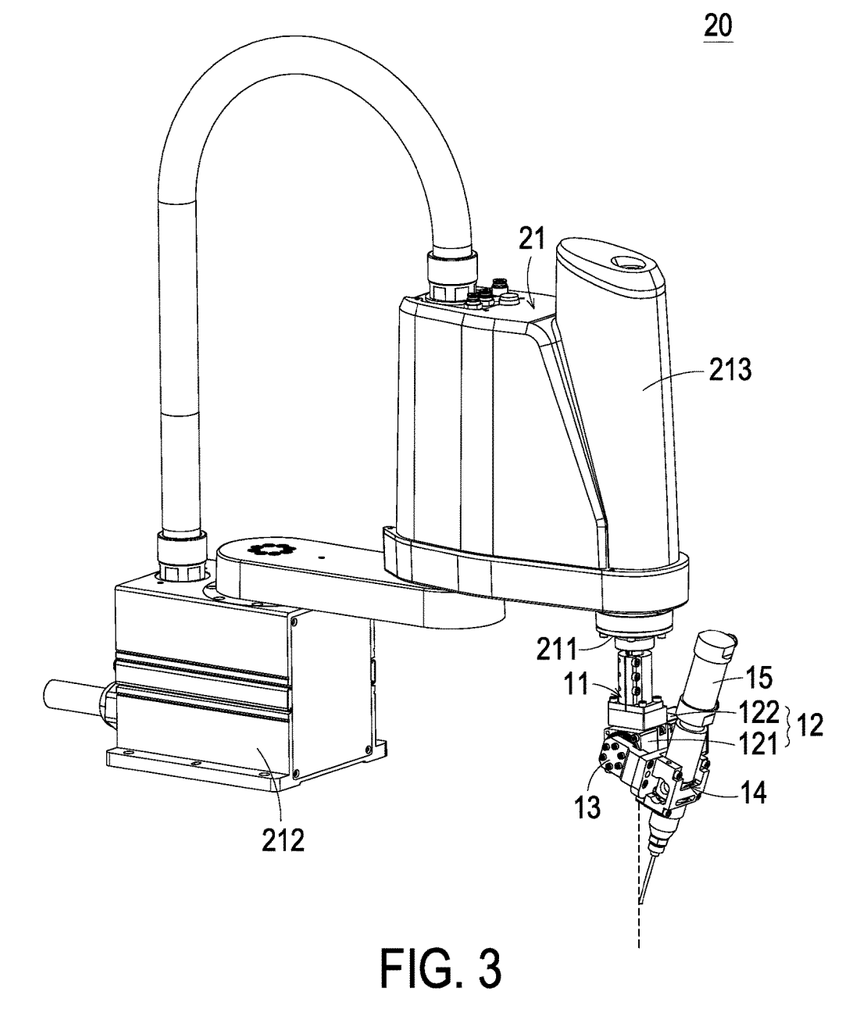
FIG. 3 is a schematic perspective view illustrating the robot manipulator of FIG. 1, wherein a tool is rotated with a specific angle.

FIG. 3 is a schematic perspective view illustrating the robot manipulator of FIG. 1, wherein a tool is rotated with a specific angle. As shown in FIG. 3, the motor 122 of the tool driving module 10 is work, and the power output end of the speed reducer 121 drives the driving arm 13 so that the tool fixing bracket 14 and the tool 15 are rotated synchronously. For the tool driving module 10 of this embodiment, during the rotation of the tool 15, the tool center point of the tool 15 and an extending line from the axis of the end-shaft 211 are at a common point. Consequently, the working range of the tool 15 is remained to be the same with the working range of the end-shaft 211.

Figure 4:
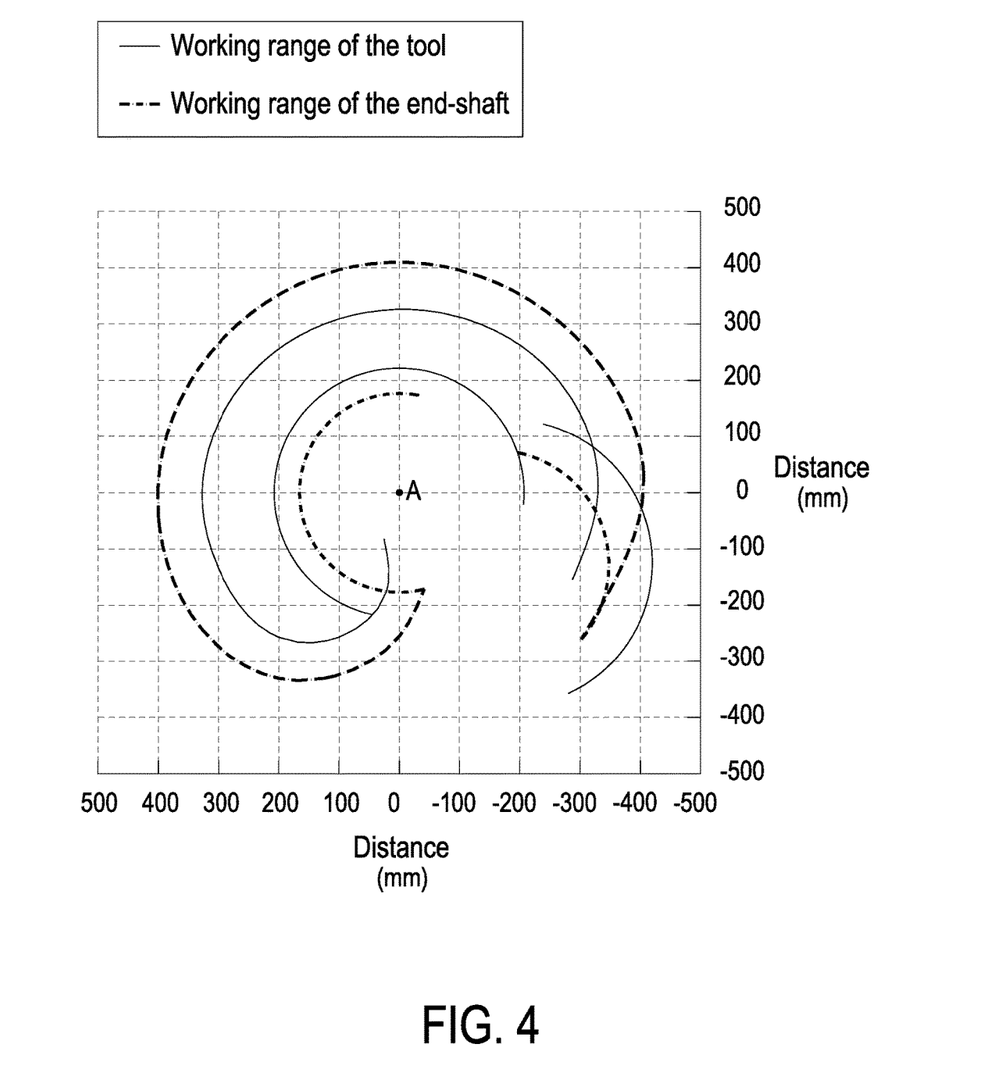
FIG. 4 is a plot illustrating the working range of the end-shaft of a conventional robot manipulator and the working range of the tool.
Figure 5:
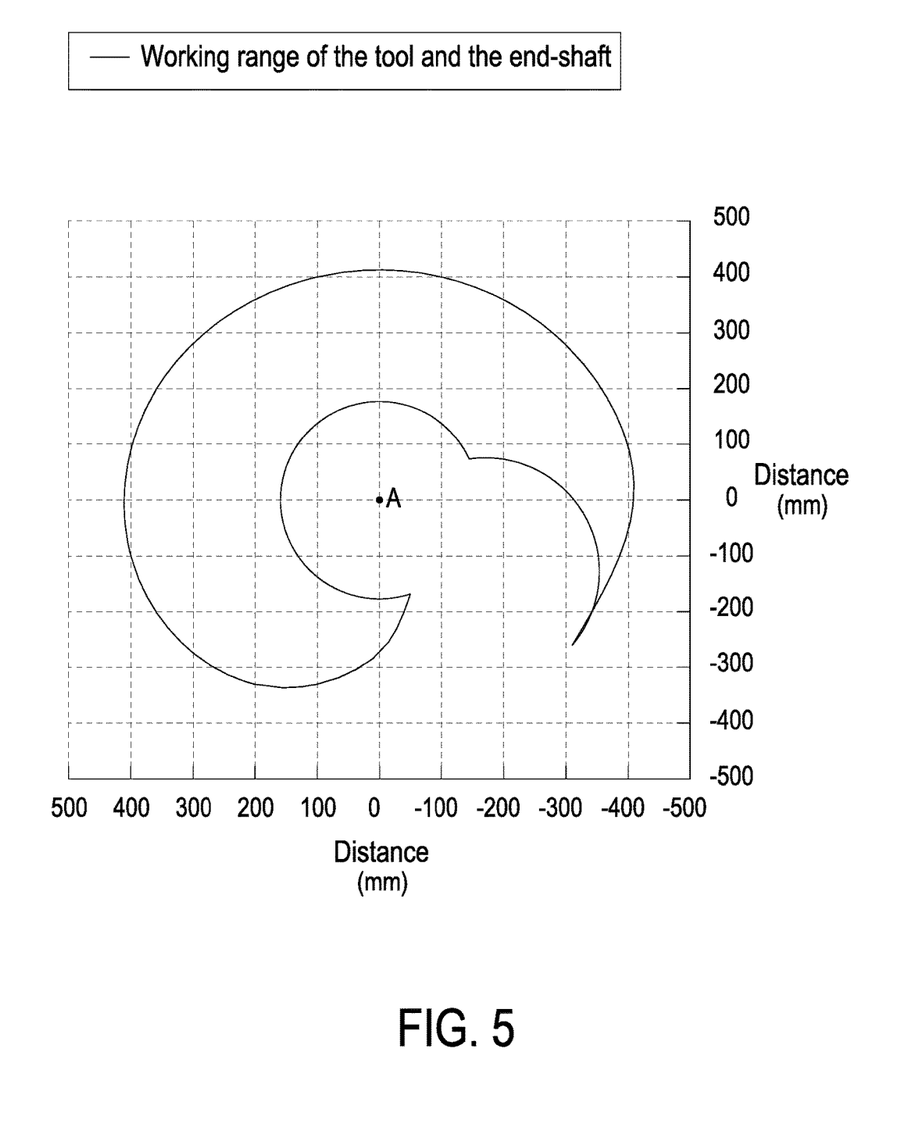
FIG. 5 is a plot illustrating the working range of the end-shaft of the robot manipulator of FIG. 3 and the working range of the tool disposed on the tool driving module.

The following is the further description for explaining that the working range of the tool 15 disposed on the tool driving module 10 of the robot manipulator 20 of the present disclosure is larger than the working range of the tool disposed on the conventional robot manipulator. FIG. 4 is a plot illustrating the working range of the end-shaft of the conventional robot manipulator and the working range of the tool. FIG. 5 is a plot illustrating the working range of the end-shaft of the robot manipulator of FIG. 3 and the working range of the tool disposed on the tool driving module. As shown in FIGS. 4 and 5, the center A is actually the position of the axis of the end-shaft 211. In FIG. 4, the dotted line represents the working range of the end-shaft, and the solid line represents the working range of the tool. For the conventional robot manipulator such as the second-type robot manipulator described in the background of the disclosure, the axis of the tool and the axis of the end-shaft are parallel and apart from each other with a distance. Comparing with the maximum working range of the end-shaft, the maximum working range of the tool is reduced. As shown in FIG. 5, since the tool driving module 10 of this embodiment allows the tool center point of the tool 15 and the extending line of the axis of the end-shaft 211 to be at a common point during the rotation of the tool 15, the tool driving module 10 of this embodiment makes the maximum working range of the tool 15 extend to be the same with the maximum working range of the end-shaft 211. Consequently, the working range of the tool 15 is larger.

By using the tool driving module 10 of the present disclosure, the motor driving module 12 drives the driving arm 13 to rotate automatically so that the tool fixing bracket 14 and the tool 15 are rotates synchronously and the work position of the tool 15 is changed. Consequently, the robot manipulator with the tool are easy to be operated, and the production efficiency of the robot manipulator is improved. In addition, the tool driving module 10 of the present disclosure allows the tool center point of the tool 15 and the extending line of the axis of the end-shaft 211 to be at a common point during the rotation of the tool 15, so that the working range of the tool 15 is broadened. Furthermore, various tools 15 can be detachably mounted on the tool fixing bracket 14 of the tool driving module 10 according to practical requirements without being limited by the form of the robot manipulator. The tool driving module 10 of the present disclosure can be employed in various applications, so that the cost is reduced. Moreover, in the robot manipulator 20 of the present disclosure, the tool driving module 10 can be detachably coupled with the end-shaft 211 of the articulated arm 21 without changing the original structure and circuit of the articulated arm 21.

Figure 6:
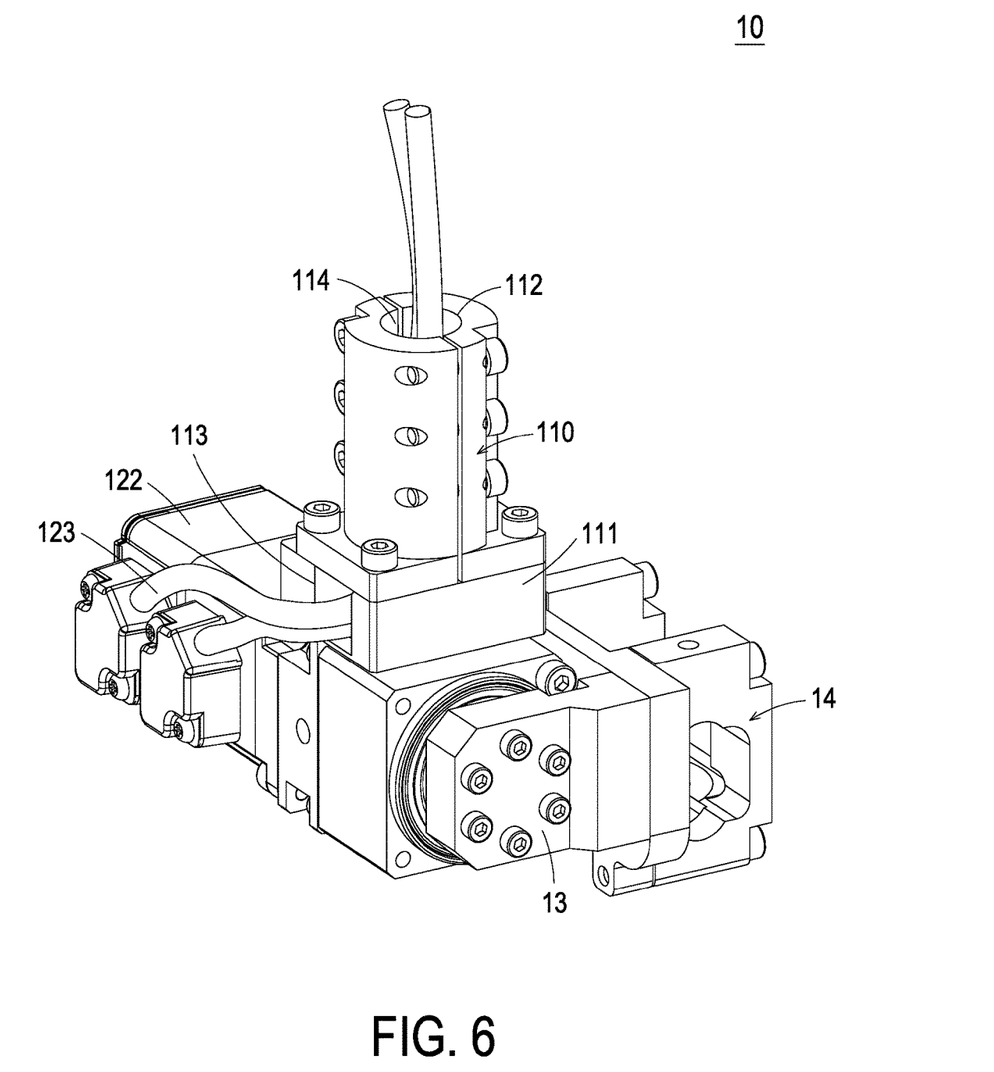
FIG. 6 is a schematic perspective view illustrating the tool driving module of FIG. 2A from another viewpoint.

FIG. 6 is a schematic perspective view illustrating the tool driving module of FIG. 2A from another viewpoint. As shown in FIG. 6, in some embodiments, in order to route the line assembly 123 with a simplified structure, the combination bracket 111 further comprises a second hollow portion 113. The second hollow portion 113 is in communication with the first hollow portion 114 of the shaft connection sleeve 110. The second hollow portion 113 is configured to accommodate the line assembly 123. The line assembly 123 is disposed in the hollow portion (not shown) of the end-shaft 211 via the second hollow portion 113, the first hollow portion 114 and an opening 112 of the first hollow portion 114. Therefore, the line assembly 123 can be routed by hollow portions, and the wiring of line assembly 123 is simplified. Since the line assembly 123 is disposed in the hollow portion of the end-shaft 211, as located in the axis of the end-shaft 211, the rotation angle of the line assembly 123 is small during the rotation of the end-shaft 211. Consequently, the frictional damage of the line assembly 123 is reduced. In above-mentioned embodiment, the line assembly 123 comprises for example one or more power line and/or one or more signal line connected with the motor 122 as shown in FIG. 6. In an embodiment, as the tool 15 is the pneumatic clamping jaw or the suction pad, the line assembly 123 comprises for example an air pipe connected with the tool 15. In other embodiment, as the tool 15 needs to be driven by the electric energy or the signal, the line assembly 123 comprises for example one or more power line and/or one or more signal line connected with the tool 15. It is noted that the line assembly 123 is not limited to the above-mentioned lines. Other lines capable of being disposed in the second hollow portion 113 for simplifying the wiring can be employed in the line assembly 123.

Figure 7:
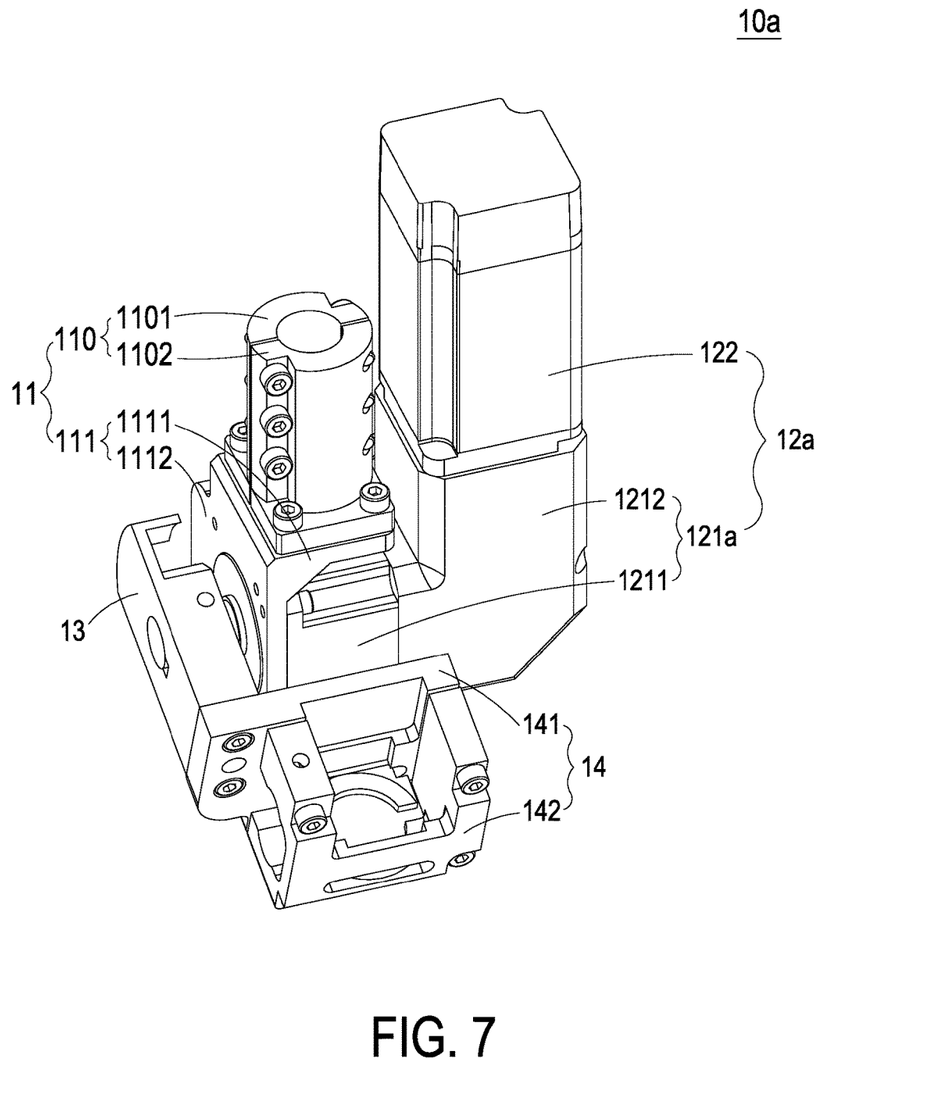
FIG. 7 is a schematic perspective view illustrating a robot manipulator according to another embodiment of the present disclosure.

FIG. 7 is a schematic perspective view illustrating a robot manipulator according to another embodiment of the present disclosure. Component parts and elements corresponding to those of the tool driving module 10 shown in FIG. 2A are designated by identical numeral references, and detailed descriptions thereof are omitted. In this embodiment, the combination bracket 111 comprises a first combination plate 1111 and a second combination plate 1112. The first combination plate 1111 is perpendicular to the second combination plate 1112, and the first combination plate 1111 is coupled with the bottom of the shaft connection sleeve 110. The motor driving module 12a of the tool driving module 10a not only comprises the motor 122 but also comprises an L-type speed reducer 121a. The L-type speed reducer 121a comprises a first portion 1211 and a second portion 1212. The first portion 1211 is perpendicular to the second portion 1212, and the first portion 1211 is coupled with the second combination plate 1112. The first portion 1211 also comprises a power output end, and the power output end is coupled with the driving arm 13. The second portion 1212 is coupled with the motor 122. The motor 122 is parallel with the axis of the end-shaft 211. In this embodiment, the tool driving module 10a allows the tool center point of the tool and the extending line of the axis of the end-shaft 211 to be at a common point during the rotation of the tool.

Figure 8:
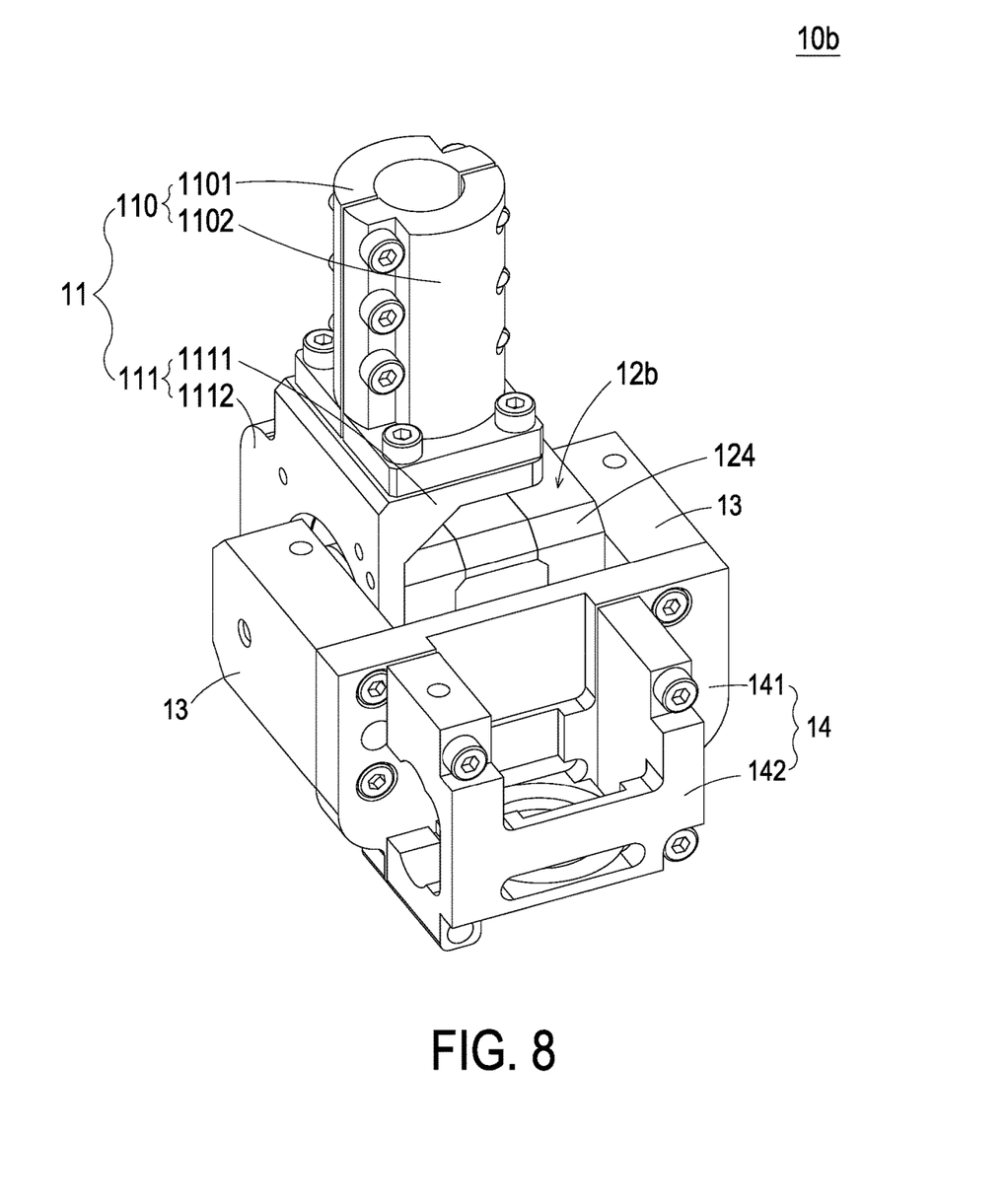
FIG. 8 is a schematic perspective view illustrating a robot manipulator according to a further embodiment of the present disclosure.

FIG. 8 is a schematic perspective view illustrating a robot manipulator according to a further embodiment of the present disclosure. Component parts and elements corresponding to those of the tool driving module 10 shown in FIG. 2A are designated by identical numeral references, and detailed descriptions thereof are omitted. In comparison with the tool driving module 10 of FIG. 2A, the tool driving module 10b of this embodiment comprises two driving arms 13, and the motor driving module 12b of the tool driving module 10b comprises a speed reducer motor 124. The speed reducer motor 124 is coupled with the second combination plate 1112, and the speed reducer motor 124 comprises two power output ends. One of the two power output ends is connected with one of the two driving arms 13, and the other one of the two power output ends is connected with the other one of the two driving arms 13. The tool fixing bracket 14 is connected between the two driving arms 13. Consequently, the two power output ends can drive the two driving arms 13, the tool fixing bracket 14 and the tool to rotate synchronously. In this embodiment, the tool driving module 10b allows the tool center point of the tool and the extending line of the axis of the end-shaft 211 to be at a common point during the rotation of the tool.

From the above descriptions, the present disclosure provides a tool driving module and a robot manipulator employing the same. The tool driving module can drives the driving arm to rotate automatically by using the motor driving module so that the work position of the tool is changed.

Consequently, the robot manipulator with the tool are easier to be operated, and the production efficiency of the robot manipulator is improved. In addition, the tool driving module of the present disclosure allows the tool center point of the tool and the extending line of the axis of the end-shaft to be at a common point during the rotation of the tool, so that the working range of the tool is broadened. Furthermore, various tools can be detachably mounted on the tool fixing bracket of the tool driving module according to practical requirements. The tool driving module of the present disclosure can be employed in various applications, so that the cost is reduced. In addition, in the robot manipulator of the present disclosure, the tool driving module can be detachably coupled with the end-shaft of the articulated arm without changing the original structure and circuit of the articulated arm. Moreover, the line assembly is disposed in the hollow portion of the end-shaft via the second hollow portion, the first hollow portion and an opening of the first hollow portion. The line assembly can be routed by hollow portions, and the wiring of line assembly is simplified, and the frictional damage of the line assembly is reduced.

While the disclosure has been described in terms of what is presently considered to be the most practical and preferred embodiments, it is to be understood that the disclosure needs not be limited to the disclosed embodiment.

What is claimed is:

1. A tool driving module for a robot manipulator comprising an end-shaft, the tool driving module comprising:
    a connection part coupled with the end-shaft, and comprising a combination bracket;
    a motor driving module coupled with the combination bracket;
    a driving arm connected with the motor driving module, and driven by the motor driving module to rotate; and
    a tool fixing bracket connected with the driving arm for mounting a tool thereon;
    wherein the tool fixing bracket and the tool are driven by the driving arm to rotate synchronously, and a tool center point of the tool and an extending line of an axis of the end-shaft are at a common point via the rotation of the tool.

2. The tool driving module according to claim 1, wherein a center line of the tool and the axis of the end-shaft are located at a common plane, and the driving arm is rotated around a rotation axis, and wherein the rotation axis is perpendicular to the common plane.

3. The tool driving module according to claim 1, wherein the connection part comprises a shaft connection sleeve coupled with the end-shaft and the combination bracket, wherein the shaft connection sleeve comprises a first fixing part and a second fixing part, and a first hollow portion is formed between the first fixing part and the second fixing part for accommodating the end-shaft therein.

4. The tool driving module according to claim 3, wherein the combination bracket comprises a second hollow portion in communication with the first hollow portion for accommodating a line assembly therein, and wherein the line assembly is disposed in the end-shaft via the second hollow portion, the first hollow portion and an opening of the first hollow portion.

5. The tool driving module according to claim 1, wherein the motor driving module comprises:
    a speed reducer connected with the combination bracket and comprising a power output end coupled with the driving arm; and
    a motor coupled with the speed reducer and the combination bracket for driving the speed reducer and allowing the driving arm, the tool fixing bracket and the tool to be rotated synchronously via the driving of the power output end.

6. The tool driving module according to claim 1, wherein the motor driving module comprises:
    a L-type speed reducer comprising a first portion and a second portion, wherein the first portion is perpendicular to the second portion, and the first portion is connected with the combination bracket, wherein the first portion comprises a power output end connected with the driving arm; and
    a motor coupled with the second portion of the L-type speed reducer for driving the L-type speed reducer and allowing the driving arm, the tool fixing bracket and the tool to be rotated synchronously via the driving of the power output end, wherein the motor is parallel with the axis of the end-shaft.

7. The tool driving module according to claim 1, wherein the motor driving module is a speed reducer motor connected with the combination bracket and comprising two power output ends.

8. The tool driving module according to claim 7, wherein the tool driving module further comprises another driving arm, wherein one of the two driving arms is connected with one of the two power output ends, the other of the two driving arms is connected with the other of the two power output ends, and the tool fixing bracket is connected between the two driving arms, wherein as the speed reducer motor operates, the two driving arms, the tool fixing bracket and the tool are driven by the two power output ends to rotate synchronously.

9. The tool driving module according to claim 1, wherein the tool fixing bracket comprises:
    a connection part connected with the driving arm; and
    a clamping part detachably connected with the connection part, wherein a clamping space is formed between the connection part and the clamping part for mounting the tool therein.

10. A robot manipulator, comprising:
    an articulated arm comprising an end-shaft; and
    a tool driving module detachably connected with the end-shaft of the articulated arm, wherein the tool driving module comprises:
        a connection part coupled with the end-shaft, and comprising a combination bracket;
        a motor driving module coupled with the combination bracket;
        a driving arm connected with the motor driving module, and driven by the motor driving module to rotate; and
        a tool fixing bracket connected with the driving arm for mounting a tool thereon;
        wherein the tool fixing bracket and the tool are driven by the driving arm to rotate synchronously, and a tool center point of the tool and an extending line of an axis of the end-shaft are at a common point via the rotation of the tool.

11. The robot manipulator according to claim 10, wherein a center line of the tool and the axis of the end-shaft are located at a common plane, and the driving arm is rotated around a rotation axis, and wherein the rotation axis is perpendicular to the common plane.

12. The robot manipulator according to claim 10, wherein the connection part comprises a shaft connection sleeve coupled with the end-shaft and the combination bracket, wherein the shaft connection sleeve comprises a first fixing part and a second fixing part, and a first hollow portion is formed between the first fixing part and the second fixing part for accommodating the end-shaft therein.

13. The robot manipulator according to claim 12, wherein the combination bracket comprises a second hollow portion in communication with the first hollow portion for accommodating a line assembly therein, and wherein the line assembly is disposed in the end-shaft via the second hollow portion, the first hollow portion and an opening of the first hollow portion.

14. The robot manipulator according to claim 10, wherein the motor driving module comprises:
   a speed reducer connected with the combination bracket and comprising a power output end coupled with the driving arm; and
   a motor coupled with the speed reducer and the combination bracket for driving the speed reducer and allowing the driving arm, the tool fixing bracket and the tool to be rotated synchronously via the driving of the power output end.

15. The robot manipulator according to claim 10, wherein the motor driving module comprises:
   a L-type speed reducer comprising a first portion and a second portion, wherein the first portion is perpendicular to the second portion, and the first portion is connected with the combination bracket, wherein the first portion comprises a power output end connected with the driving arm; and
   a motor coupled with the second portion of the L-type speed reducer for driving the L-type speed reducer and allowing the driving arm, the tool fixing bracket and the tool to be rotated synchronously via the driving of the power output end, wherein the motor is parallel with the axis of the end-shaft.

16. The robot manipulator according to claim 10, wherein the motor driving module is a speed reducer motor connected with the combination bracket and comprising two power output ends.

17. The robot manipulator according to claim 16, wherein the tool driving module further comprises another driving arm, wherein one of the two driving arms is connected with one of the two power output ends, the other of the two driving arms is connected with the other of the two power output ends, and the tool fixing bracket is connected between the two driving arms, wherein as the speed reducer motor operates, the two driving arms, the tool fixing bracket and the tool are driven by the two power output ends to rotate synchronously.

18. The robot manipulator according to claim 10, wherein the tool fixing bracket comprises:
   a connection part connected with the driving arm; and
   a clamping part detachably connected with the connection part, wherein a clamping space is formed between the connection part and the clamping part for mounting the tool therein.

* * * * *